United States Patent [19]
Ohkura et al.

[11] Patent Number: 5,809,846
[45] Date of Patent: Sep. 22, 1998

[54] METHOD OF POWER TRANSMISSION IN MECHANICAL/HYDRAULIC TYPE TRANSMISSION SYSTEM

[75] Inventors: Yasunori Ohkura; Noboru Kanayama, both of Kanagawa, Japan

[73] Assignee: Komatsu Ltd., Tokyo, Japan

[21] Appl. No.: 714,099

[22] PCT Filed: Mar. 31, 1995

[86] PCT No.: PCT/JP95/00628

§ 371 Date: Sep. 26, 1996

§ 102(e) Date: Sep. 26, 1996

[87] PCT Pub. No.: WO95/27160

PCT Pub. Date: Oct. 12, 1995

[30] Foreign Application Priority Data

Mar. 31, 1994 [JP] Japan .................................. 6-87837

[51] Int. Cl.⁶ .................................................. F16H 47/04
[52] U.S. Cl. ............................ 74/733.1; 475/78; 477/69
[58] Field of Search ............................ 74/733.1; 475/78, 475/80; 477/68, 69, 143, 80, 86; 60/441, 437

[56] References Cited

U.S. PATENT DOCUMENTS

| | | | |
|---|---|---|---|
| 3,442,153 | 5/1969 | Ross | 475/78 |
| 4,790,418 | 12/1988 | Brown et al. | |
| 4,983,149 | 1/1991 | Kita | 475/78 |
| 5,186,692 | 2/1993 | Gleasman et al. | 475/78 |
| 5,683,328 | 11/1997 | de Schepper et al. | 477/80 |

FOREIGN PATENT DOCUMENTS

| | | |
|---|---|---|
| 0417283 | 3/1991 | European Pat. Off. |
| 63-297849 | 12/1988 | Japan |
| 2-195062 | 8/1990 | Japan |
| 3-56754 | 3/1991 | Japan |

*Primary Examiner*—Charles A. Marmor
*Assistant Examiner*—Sherry Lyon Estremsky
*Attorney, Agent, or Firm*—Sidley & Austin

[57] ABSTRACT

A method of power transmission in a mechanical/hydraulic type transmission system, by which changeover is smoothly effected between hydraulic power transmission and mechanical power transmission is provided. To this end, there are provided a hydraulic power transmitting means, for transmitting a mechanical power (Pm), which has been converted by a hydraulic motor (42), to the outside (300) by the engagement of a clutch (A), and a mechanical power transmitting means for transmitting a mechanical power (Po) to the outside (300) by the engagement of a clutch (B). Upon changeover from hydraulic power transmission to mechanical power transmission, the releasing of the clutch (A) is performed after the engagement of the clutch (B) is started and before the engagement of the clutch (B) is completed.

20 Claims, 7 Drawing Sheets

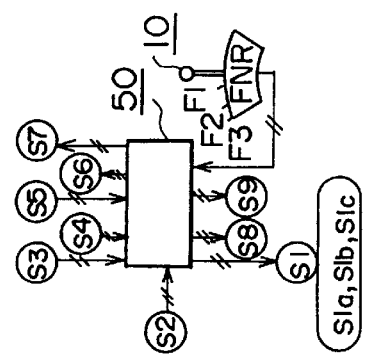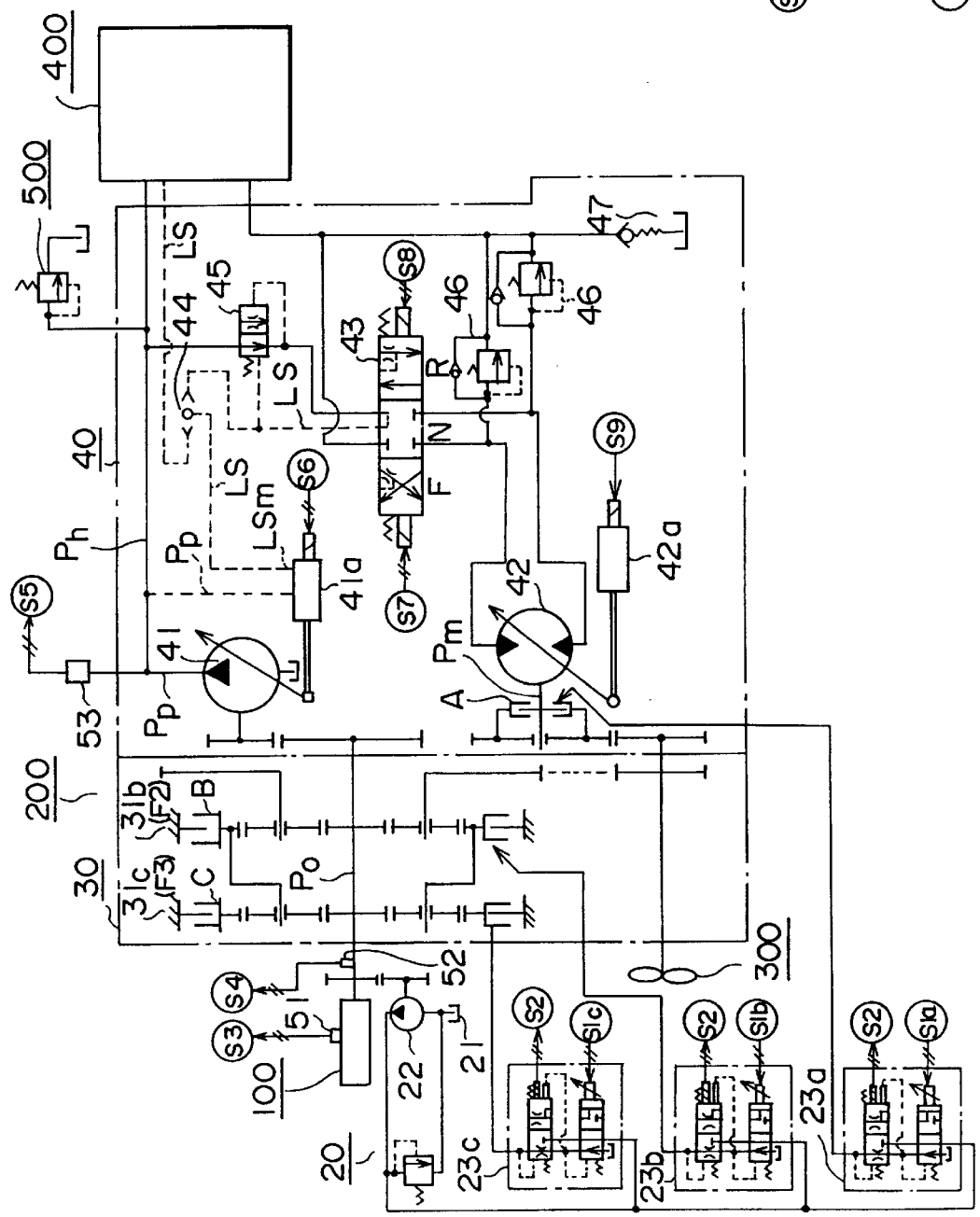

METHOD OF POWER TRANSMISSION IN MECHANICAL/HYDRAULIC TYPE TRANSMISSION SYSTEM

TECHNICAL FIELD

The present invention relates to a method of power transmission in a mechanical/hydraulic type transmission system, and more particularly to a method of power transmission in a mechanical/hydraulic type transmission system which is suitable for use as a transmission for self-propelled vehicles, e.g., construction machinery such as wheel type hydraulic excavators, rough terrain cranes, agricultural vehicles, automobiles, etc.

BACKGROUND ART

Heretofore, a mechanical/hydraulic type transmission system comprised a hydraulic power transmitting means for transmitting a mechanical power Pm, which had been converted from a hydraulic power Ph by a hydraulic motor, to the outside by the engagement of a clutch A, and a mechanical power transmitting means for transmitting a mechanical power Po to the outside by the engagement of a clutch B.

Because such a mechanical/hydraulic type transmission system can control the hydraulic power transmitting means and the mechanical power transmitting means separately from each other, the applicant has proposed to employ the system as a transmission for self-propelled vehicles, e.g., construction machinery such as wheel type hydraulic excavators, rough terrain cranes, agricultural vehicles, automobiles, etc. (see Japanese Unexamined Patent Publication No. 3-56754, for example).

When used as a transmission, the mechanical/hydraulic type transmission system provides the advantage that mechanical power transmission with a high power transmitting efficiency can be employed during running at high speeds and hydraulic power transmission with a high shift efficiency between forward and reverse gears and a capability of continuously variable speed change can be employed during running at low speeds.

A changeover between hydraulic power transmission and mechanical power transmission in the mechanical/hydraulic type transmission system is effected by releasing and engaging the clutches A and B simultaneously or alternately, because the hydraulic power transmitting means and the mechanical power transmitting means can be controlled separately from each other. However, if the clutches A and B are simply controlled to release and engage, a changeover shock (a shock upon releasing or engaging of the clutches) would be caused, and the clutches would generate excessive heat concomitantly, resulting in shorter machine life, and making an operator feel more unpleasant.

SUMMARY OF THE INVENTION

In view of the above-stated problem in the prior art, an object of the present invention is to provide a method of power transmission in a mechanical/hydraulic type transmission system, by which a changeover is smoothly effected between hydraulic power transmission and mechanical power transmission in the mechanical/hydraulic type transmission system, and hence which can reduce a changeover shock and the heat generation in the clutches, prolong machine life, and make an operator feel less unpleasant.

To achieve the above object, the present invention is constituted by a method of power transmission in a mechanical/hydraulic type transmission system comprising a hydraulic power transmitting means for transmitting a hydraulic power Ph by a hydraulic motor, to the outside by the engagement of a clutch A, and a mechanical power transmitting means for transmitting a mechanical power Po to the outside by the engagement of a clutch B, the clutches A and B being released and engaged simultaneously or alternately to effect a changeover from hydraulic power transmission to mechanical power transmission or from mechanical power transmission to hydraulic power transmission.

A first feature of the invention is that, upon a changeover from hydraulic power transmission to mechanical power transmission, the releasing of the clutch A is performed after the engagement of the clutch B is started and before the engagement of the clutch B is completed.

A second feature of the invention is that, upon a changeover from mechanical power transmission to hydraulic power transmission, the releasing of the clutch B is performed after the engagement of the clutch A is completed. Further, upon changeover from mechanical power transmission to hydraulic power transmission, the rotation of the hydraulic motor can be started before the engagement of the clutch A is started.

With the first and second features of invention, a changeover between hydraulic power transmission and mechanical power transmission is effected by releasing and engaging the clutches A and B in crossover relation. This crossover control makes it possible to smoothly effect the changeover, and hence reduce a changeover shock and the heat generation in the clutches.

BRIEF DESCRIPTION OF THE DRAWINGS

FIGS. 1A and 1B show a transmission of a construction machine to which a method of power transmission according to an embodiment of the present invention is applied, in which:

FIG. 1A is an entire arrangement diagram, and

FIG. 1B is an explanatory view of the signal systems,

FIGS. 3A to 3F are time charts of the shift-up process according to the invention, in which:

FIG. 3A is a chart showing increase and decrease in the clutch hydraulic pressure, FIG. 3B is a chart showing the control of a traveling valve, FIG. 3C is a chart showing the control of a motor capacity, FIG. 3D is a chart showing changes in the respective clutch torques, FIG. 3E is a chart showing changes in the total clutch torque, and FIG. 3F is a chart showing the amount of heat generated by the clutches.

FIGS. 4A to 4F are time charts, corresponding to FIGS. 3A to 3F of a shift-up process as a comparative example, in which:

FIG. 4A is a chart showing increase and decrease in the clutch hydraulic pressure, FIG. 4B is a chart showing the control of a traveling valve, FIG. 4C is a chart showing the control of a motor capacity, FIG. 4D is a chart showing changes in the respective clutch torques, FIG. 4E is a chart showing changes in the total clutch torque, and FIG. 4F is a chart showing the amount of heat generated by the clutches.

FIGS. 6A to 6F are time charts of the shift-down process according to the invention, in which:

FIG. 6A is a chart showing increase and decrease in the clutch hydraulic pressure, FIG. 6B is a chart showing the control of a TVC signal (i.e., a pump absorbing torque), FIG. 6C is a chart showing the control of a traveling valve, FIG. 6D is a chart showing changes in the revolutions per minute of a hydraulic motor, FIG. 6E is a chart showing changes in inlet hydraulic pressure of the hydraulic motor, and FIG. 6F is a chart showing changes in the total clutch torque.

FIGS. 7A to 7F are time charts, corresponding to FIGS. 6A to 6F, of a shift-down process as a comparative example, in which:

FIG. 7A is a chart showing increase and decrease in the clutch hydraulic pressure, FIG. 7B is a chart showing the control of a TVC signal, FIG. 7C is a chart showing the control of a traveling valve, FIG. 7D is a chart showing changes in the revolutions per minute of a hydraulic motor, FIG. 7E is a chart showing changes in the inlet hydraulic pressure of the hydraulic motor, and FIG. 7F is a chart showing changes in the total clutch torque.

BEST MODE FOR CARRYING OUT THE INVENTION

Figure 2:
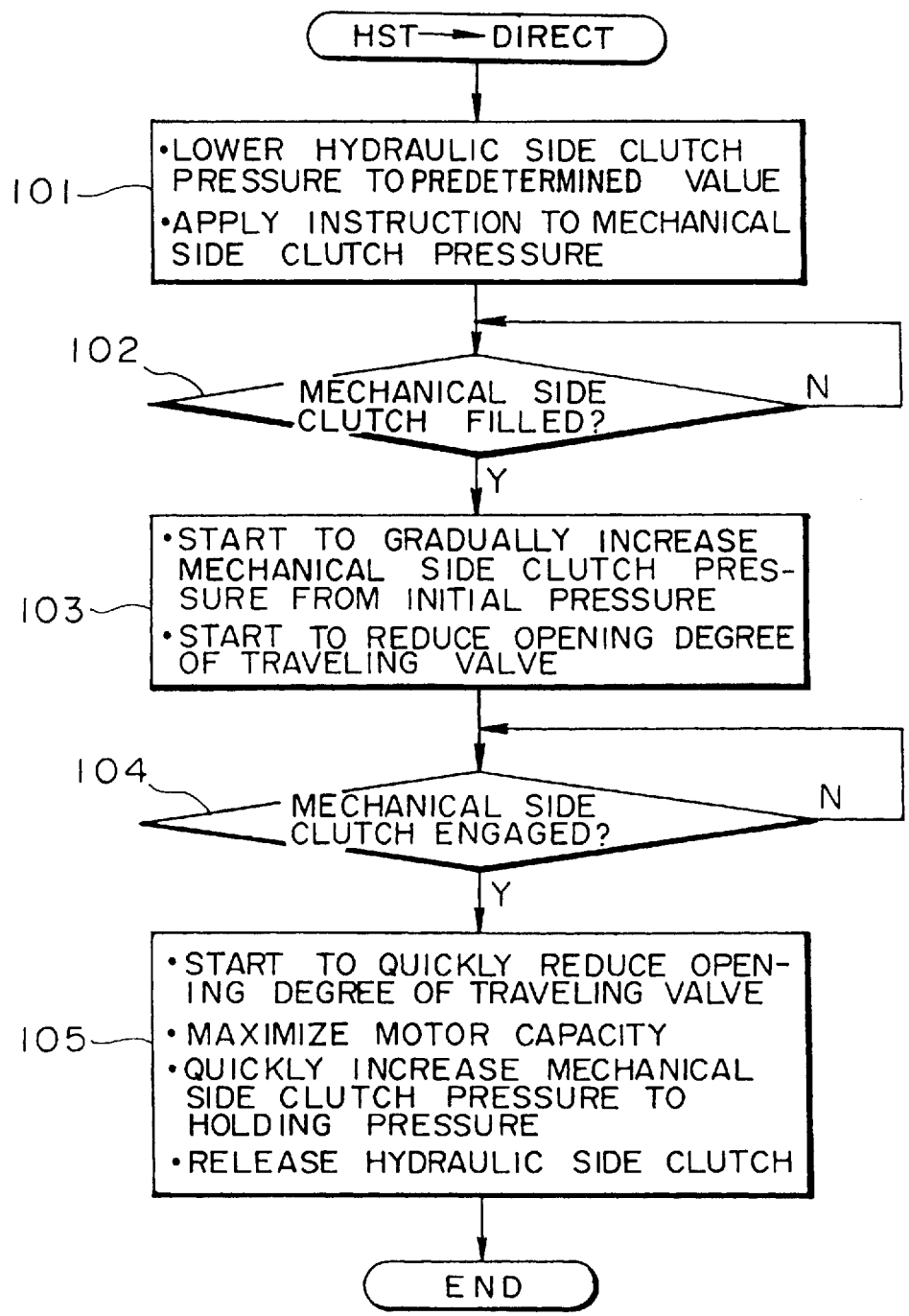
FIG. 2 is a flowchart of a shift-up process according to the invention.

A method of power transmission in a mechanical/hydraulic type transmission system according to the present invention will be described below in detail with reference to the accompanying drawings.

In FIGS. 1A and 1B, a mechanical power Po from an engine 100 is transmitted to an axle 300 through a transmission 200. The transmission 200 is a mechanical/hydraulic type transmission system, comprising a shift lever 10, a clutch hydraulic circuit 20, a mechanical drive section 30, a hydraulic drive section 40, and a control section 50 constituted by a microcomputer, etc. Details are as follows.

The shift lever 10 has R (reverse), N (neutral), F1 (forward first-gear), F2 (forward second-gear) and F3 (forward third-gear) positions, and is selectively moved to one of these positions by an operator manipulating the lever. The selected position is detected by a position sensor (not shown) and outputted to the control section 50.

The clutch hydraulic circuit 20 is constructed such that oil, sucked from an oil tank 21 by a hydraulic pump 22, which is driven by the engine 100, is supplied to clutches A, B, and C through the selector valves 23a, 23b, and 23c. The selector valves 23a, 23b, and 23c are associated with the clutches A, B, and C, respectively, and are shifted upon receiving respective control signals S1a, S1b, and S1c from the control section 50 to effect supply and discharge of the oil to and from the clutches A, B, and C. Also, the selector valves 23a, 23b, and 23c can change the pressure of the supplied oil continuously, depending on the magnitudes of the control signals S1a, S1b, and S1c. Further, each of the selector valves 23a, 23b, and 23c is a solenoid proportional type modulation valve with a filling completion sensor which, during oil supply to the clutches A, B, and C, feedbacks a filling completion signal S2 issued when the corresponding clutch is filled with the oil, and then gradually increases the hydraulic pressure of the clutch.

The mechanical drive section 30 transmits, by engagement of the clutch B (or C), a mechanical power Po from the engine 100 to the axle 300 through the clutch B or C. The mechanical drive section 30 includes two planetary gear mechanisms 31b and 31c. When the clutch C is engaged, a ring gear of the planetary gear mechanism 31c is fixed to establish F3 traveling; and when the clutch B is engaged, a ring gear of the planetary gear mechanism 31b is fixed to establish F2 traveling. Incidentally, the supply and discharge of the oil to and from the clutches B and C and an increase in the pressure of the supplied oil are performed by the selector valves 23b and 23c, as mentioned above.

Prior to describing the hydraulic drive section 40, an entire hydraulic circuit of a construction machine will be described for easier understanding of the hydraulic drive section 40. The entire hydraulic circuit includes, in addition to a hydraulic circuit for the hydraulic drive section 40, a hydraulic circuit 400 for working implements, and a relief valve 500 for specifying a maximum pressure in the entire circuits The hydraulic circuit 400 for working implements comprises actuators, such as hydraulic cylinders for a boom, an arm, and a bucket, a swivel hydraulic motor, selector valves associated with the actuators, pressure compensating valves associated with the selector valves, a plurality of shuttle valves, hydraulic lines interconnecting those components, etc. The entire hydraulic circuit employs the so-called CLSS (Closed-center Load Sensing System) set up for a single variable displacement hydraulic pump 41 (hereinafter referred to simply as a hydraulic pump 41) operated under the so-called TVC (Torque Variable Control).

The TVC will now be described. A servo device 41a for the hydraulic pump 41 comprises an electromagnetic solenoid for a TVC valve, an LS valve (Load Sensing valve) and a servo mechanism which are arranged in the order named. The control section 50 receives an engine fuel injection amount signal S3 outputted by a throttle opening sensor 51 and an engine revolution number signal S4 outputted by a revolution sensor 52, and then calculates an engine torque Te. The control section 50 also receives a circuit hydraulic pressure Pp (signal S5) outputted by an oil pressure sensor 53, and then outputs a pump delivery rate varying signal S6 (hereinafter referred to simply as a TVC signal S6) to the electromagnetic solenoid for the TVC valve so that an absorbing torque Tp of the hydraulic pump 41 is optimally matched with the engine torque Te, i.e., so that [pump delivery rate Qm×pump delivery pressure Pp=constant] holds. The TVC signal S6 from the TVC valve is adjusted by the LS valve described later and serves to vary the delivery rate of the hydraulic pump 41 (i.e., the pump absorbing torque).

The CLSS will now be described. For a selector valve (corresponding to each selector valve in the hydraulic circuit 400 for working implements and a later-described traveling valve 43, but not to the selector valves 23a, 23b, and 23c), a flow rate Qn passing through the selector valve is proportional to the product of its opening area A and a square root of the differential pressure ΔP across the valve. That is to say, $Qn \propto A \cdot (\Delta P)^{1/2}$. Here, the differential pressure $\Delta P$ =upstream side hydraulic pressure Pu–downstream side hydraulic pressure (actuator load pressure) Pd. If the differential pressure $\Delta P$ is constant ($\Delta P$=constant), the flow rate Qn ($\propto$A), being proportional to only the opening area A, passes through the selector valve regardless of the magnitude of the associated load pressure Pd).

In other words, the LS valve is a valve which receives both the delivery pressure Pp of the hydraulic pump 41 and the load pressure Pp on the side of the selector valve communicating with the actuator, and then outputs to the servo mechanism a signal for controlling the delivery rate Q of the hydraulic pump 41. If there is one selector valve, the LS valve controls the hydraulic pump 41 depending on the differential pressure $\Delta P$ across that valve alone. It is, however, usual as in the construction machine of this embodiment that actuators and associated selector valves are each present in plural number, and load pressures Pd of the actuators are different from each other.

Therefore, shuttle valves 44 are disposed at junction points between respective LS circuits (i.e., respective pilot circuits for introducing the load pressures Pd of the selector valves to the LS valve), and pressure compensating valves 45 are associated with the selector valves. The provision of the shuttle valves 44 allows a maximum load pressure LSm among the actuators, instead of the load pressures Pd, to be introduced to the LS valve which in turn controls the servo mechanism so that the LS differential pressure $\Delta PLS$ (=Pp–LSm) is constant, i.e., so that the pump delivery rate Q coincides with a total flow rate Qnn of the selector valves. Each of the pressure compensating valves 45 is a valve which receives the maximum load pressure LSm as a pilot pressure and then operates so that the differential pressure $\Delta P$ across the associated selector valve is kept equal to the LS differential pressure $\Delta PLS$, regardless of the magnitude of the load pressure Pd of the associated selector valve (when some particular actuator is to be given priority, the differential pressure across the associated selector valve is set so as to satisfy, e.g., $\Delta P<\Delta PLS$). With the provision of the pressure compensating valves, the selector valves can ensure the flow rates corresponding to their opening areas (e.g., the lever strokes of the control levers for moving the selector valves) without affecting each other, even if the load pressures Pd are different from each other, (meaning that, for example, fine operation of each actuator can be achieved). Incidentally, the selector valves in the CLSS are of the closed center type. This is because if the selector valves in the CLSS are of the open center type, the pump delivery pressure Pp to be introduced to the LS valve with the selector valve being in its neutral position would be a drain pressure led to the oil tank and the LS valve (i.e., the CLSS) would fail to function thereafter.

Figure 6A:
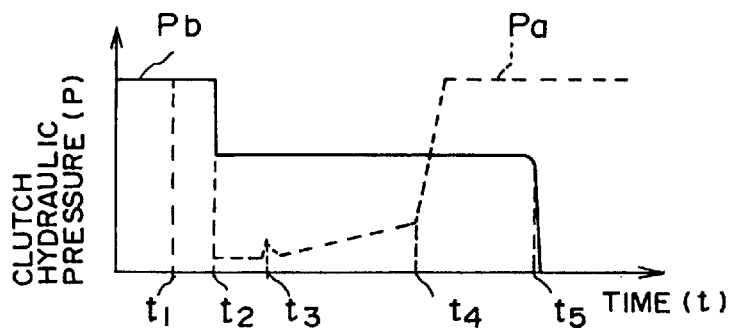
Figure 6B:
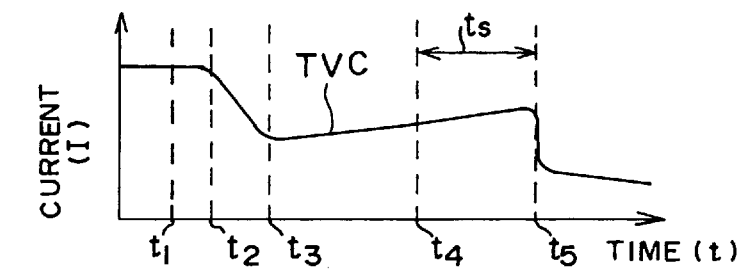
Figure 7A:
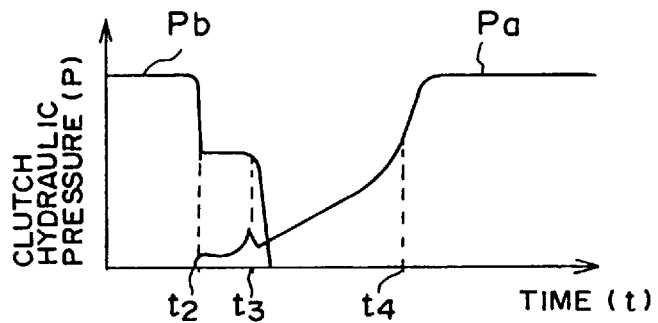
Figure 7B:
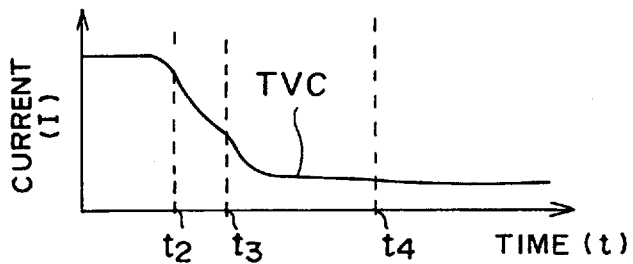

The relationship between the TVC and the CLSS will now be described briefly. The TVC is to vary the absorbing torque of the hydraulic pump, depending on changes in oil pressure, to maintain the pump absorbing torque to such an extent that the engine will not stall. On the other hand, the CLSS is to enable the oil to be supplied to each of the actuators at a demanded flow rate, depending on the opening area of the associated selector valve, regardless of the load pressure of the actuator, on condition that the pump absorbing torque determined by the TVC is set as an upper limit. The TVC is usually configured so as to reduce the pump delivery rate with an increase in TVC current. It is therefore to be noted here that the TVC signal S6 and FIGS. 6B and 7B, which will be described later, are based on such a usual configuration.

Returning to the main subject of the description. The hydraulic drive section 40 is constructed such that the mechanical power Po from the engine 100 is converted into a hydraulic power Ph by the hydraulic pump 41, the hydraulic power Ph is converted back into a mechanical power Pm by a variable displacement hydraulic motor 42 (hereinafter referred to simply as a hydraulic motor 42) through a selector valve 43 (hereinafter referred to as a traveling valve 43) serving as a forward/reverse switching valve, and the mechanical power Pm is then transmitted to the axle 300 by engagement of the clutch A. Supply and discharge of the oil to and from the clutch A and an increase in pressure of the supplied oil are performed by the selector valve 23a, as mentioned above. The traveling position 43 has a forward position (F), a neutral position (N) and a reverse position (R). The hydraulic motor 42 is controlled by a servo device 42a in a variable capacity manner, and a signal S9 for the control is outputted from the control section 50 to the servo device 42a. Denoted by 46 is a safety valve with a suction valve for preventing the occurrence of cavitation and an abnormal pressure under overrun. 47 is a back pressure valve for increasing the efficiency of suction of the safety valve with a suction valve. 44 is a shuttle valve for the CLSS associated with the traveling valve 43. 45 is a pressure compensating valve for the CLSS associated with the traveling valve 43.

Upon receiving a selected position signal (R, N, F1, F2 or F3) from the shift lever 10, the control section 50 stops or runs the construction machine as follows.

When the shift lever 10 is in the N (neutral) position, no signal is outputted to the traveling valve 43, whereby the traveling valve 43 is held in the N position. Also, no signals are outputted to the selector valves 23, whereby the clutches A, B, and C are released.

When the shift lever 10 is in the R (reverse) position, a signal S8 is outputted to the traveling valve 43, whereupon the traveling valve 43 is shifted to the R position for rotating the hydraulic motor 42 in the reverse direction and, at the same time, a signal S1a is outputted to the selector valve 23a for engaging the clutch A.

When the shift lever 10 is in the F1 (forward first gear) position, a signal S7 is outputted to the traveling valve 43, whereupon the traveling valve 43 is shifted to the F position for rotating the hydraulic motor 42 in the forward direction and, at the same time, a signal S1a is outputted to the selector valve 23a for engaging the clutch A.

When the shift lever 10 is in the F2 (forward second gear) position and the vehicle speed is not less than a certain speed (F2 setting value), no signal is outputted to the traveling valve 43, whereby the traveling valve 43 is shifted back to the N position for stopping the hydraulic motor 42, while a signal S1b is outputted to the selector valve 23b for engaging the clutch B. Alternatively, when the vehicle speed is not higher than the certain speed (F2 setting value), the signal S7 is outputted to the traveling valve 43, whereupon the traveling valve 43 is shifted to the F position for rotating the hydraulic motor 42 in the forward direction and, at the same time, the signal S1a is outputted to the selector valve 23a for engaging the clutch A, as with the above case of shifting to the F1 position.

When the shift lever 10 is in the F3 (forward third gear) position and the vehicle speed is not less than a certain speed (F3 setting value), no signal is outputted to the traveling valve 43, whereby the traveling valve 43 is shifted back to the N position for stopping the hydraulic motor 42, while a signal S1c is outputted to the selector valve 23c for engaging the clutch C. Alternatively, when the vehicle speed is not higher than the certain speed (F3 setting value), no signal is outputted to the traveling valve 43, whereby the traveling valve 43 is shifted back to the N position for stopping the hydraulic motor 42, while the signal S1b is outputted to the selector valve 23b for engaging the clutch B, as with the above case of shifting to the F2 position. Also, when the vehicle speed is not higher than the certain speed (F2 setting value), the signal S7 is outputted to the traveling valve 43, whereupon the traveling valve 43 is shifted to the F position for rotating the hydraulic motor 42 in the forward direction and, at the same time, the signal S1a is outputted to the selector valve 23a for engaging the clutch A as with the above case of shifting to the F1 position.

The control section 50 of the construction machine of this embodiment can output to the traveling valve 43 the signals S7 and S8 depending on the magnitude of the engine fuel injection amount signal S3 outputted by the throttle opening sensor 51, and hence can adjust the opening area of the traveling valve 43 as desired. Accordingly, the foregoing function of the CLSS makes it possible to control the F1 and RI traveling speeds as desired.

In the transmission 200 constructed as described above, there occurs a changeover between hydraulic power transmission (F1) and mechanical power transmission (F2) upon a shift-up from F1 to F2 or a shift-down from F2 to F1. Then, as stated before, if releasing and engaging of the hydraulic power transmission side clutch A and the mechanical power transmission side clutch B are simply performed in such a gear shift process, a changeover shock would be caused, and the clutches would generate excessive heat, resulting in shorter machine life, and making an operator feel more unpleasant. Therefore, the control section 50 carries out speed change control following the sequence below.

Shift-up control from F1 to F2 will be described in accordance with the flowchart of FIG. 2 while referring to FIGS. 3A to 3F.

(1) The hydraulic side clutch pressure is lowered to a predetermined value, which can be set optionally, and an instruction is applied to raise the mechanical side clutch pressure (step 101). More specifically, as indicated by t1 in FIG. 3A, the holding pressure Pa of the clutch A is lowered by reducing the signal S1a applied to the selector valve 23a. This improves a response in the releasing of the clutch A. Substantially at the same time, the signal S1b is sent to the selector valve 23b to start supplying oil to the clutch B.

(2) If the mechanical side clutch is filled with the oil (step 102), then the mechanical side clutch pressure is started to gradually increase from an initial pressure and the opening degree of the traveling valve 43 is started to reduce (step 103). More specifically, as indicated by t2 in FIG. 3A, when the clutch B is filled with the oil, the filling completion signal S2 is outputted from the selector valve 23b to the control section 50. Upon receiving this signal S2, as indicated by t2 in FIG. 3B, the control section 50 starts to gradually reduce the signal 57 supplied to the traveling valve 43 to thereby gradually reduce its opening area As in the F position. Note that a gradual increase in the hydraulic pressure of the clutch B is achieved by a modulation function of the selector valve 23b.

(3) If the mechanical side clutch is engaged (step 104), then the opening degree of the traveling valve 43 is started to reduce quickly, the motor capacity is maximized, the mechanical side clutch pressure is quickly increased to its holding pressure Pb, and the hydraulic side clutch A is released (step 105). More specifically, when the clutch B is engaged as indicated by t3 in FIG. 3A, the signal S7 supplied to the traveling valve 43 is quickly reduced to thereby quickly reduce its opening area As in the F position. In addition, as indicated by t3 in FIG. 3C, the signal S9 supplied to the servo mechanism 42a is maximized to increase the motor capacity Dm of the hydraulic motor 42 to a maximum, thereby quickly reducing the rotation of the hydraulic motor 42. An increase in the hydraulic pressure of the clutch B to the holding pressure Pb is achieved by the selector valve 23b. Releasing of the clutch A is made by cutting off the signal S1a, supplied to the selector valve 23a, causing the oil in the clutch A to be drained to the oil tank 21. The above engagement of the mechanical side clutch B is represented by a value which can be determined as, for example, a modulation time of the selector valve 23b, and this value, counting from the inputting of the filling completion signal S2, is t3. Additionally, the time (t2 to t3) until the engagement can be optionally set by varying the magnitude of the electric instruction S1b applied to the selector valve 23b. Further, since the gist of the method of power transmission according to the present invention is that the clutches A and B are released and engaged in crossover relation, the time of engagement must not always be required to adhere to it in a strict sense as with this embodiment. For example, before the engagement of the mechanical side clutch B, it is also possible to intentionally start to quickly reduce the opening degree of the traveling valve 43, to maximize the motor capacity, and to release the hydraulic side clutch A, followed by waiting for the engagement of the mechanical side clutch B. The engagement of the mechanical side clutch B can be performed prior to the time t3.

Figure 3A:
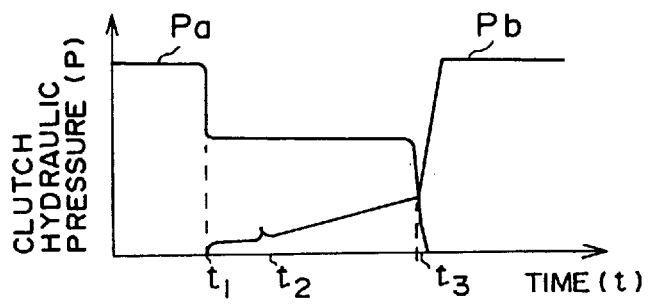
Figure 3B:
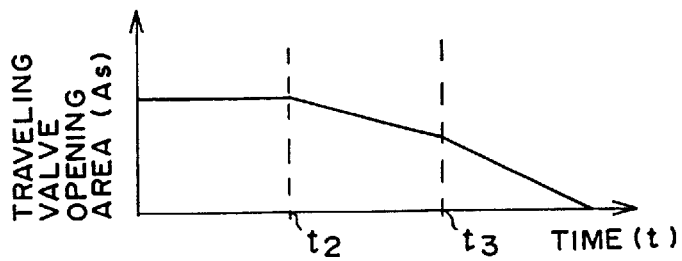
Figure 3C:
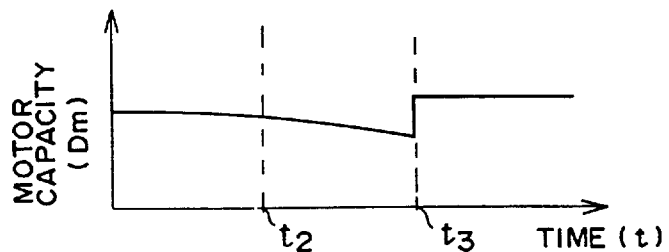
Figure 3D:
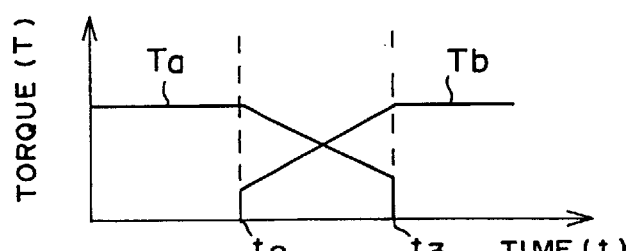
Figure 3E:
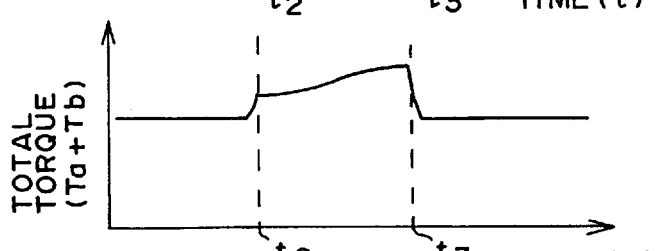
Figure 3F:
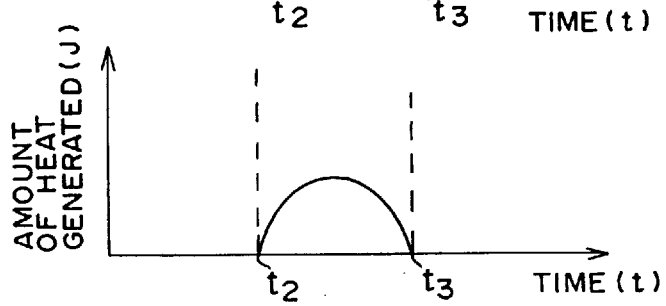
Figure 4A:
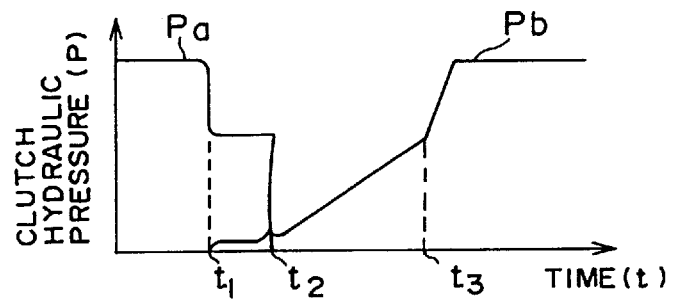
Figure 4B:
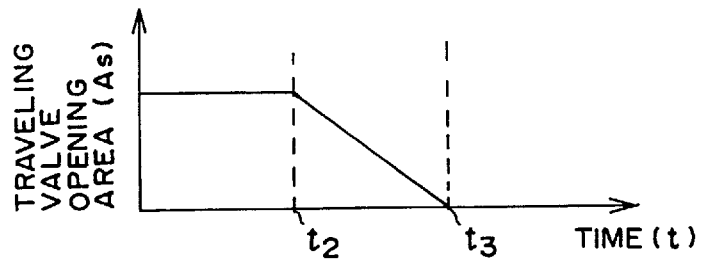
Figure 4C:
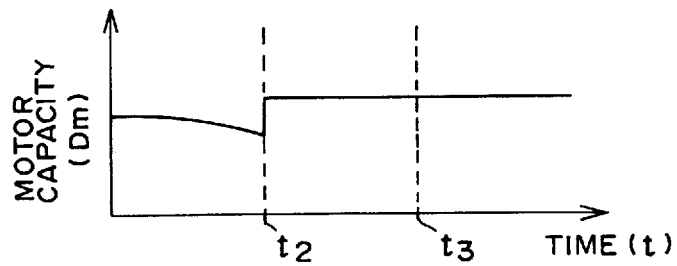
Figure 4D:
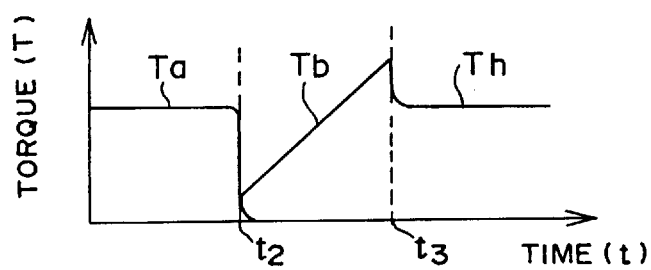
Figure 4E:
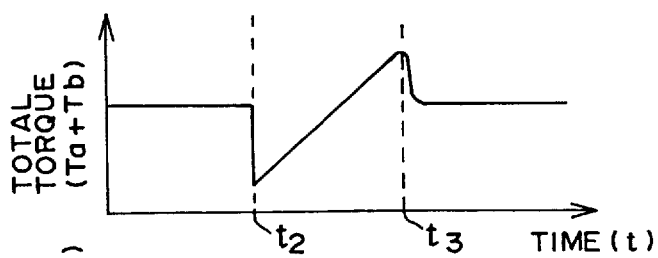
Figure 4F:
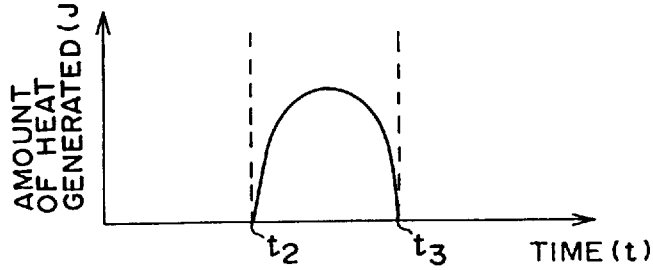

An advantage of the foregoing shift-up control will be described by referring to a comparative example (FIGS. 4A to 4F). In the foregoing embodiment, the clutches A and B are released and engaged in crossover relation. Assume a shift-up control without crossover relation wherein the hydraulic pressure of the clutch B is gradually increased after the clutch A is opened (at t2), as shown in FIG. 4A relating to the comparative example. In this shift-up control, because it is required to not only quickly increase the hydraulic pressure of the clutch B, but to also maintain a transmission torque by the clutch B alone, the transmission torques Ta and Tb of the respective clutches are as shown in FIG. 4D. A total torque Ta+Tb is as shown in FIG. 4E. Further, the heat J generated by the clutches A and B is as shown in FIG. 4F. Therefore, a large changeover shock is caused and the clutches generate excessive heat. By contrast, in the foregoing embodiment, respective torques Ta, Tb are as shown in FIG. 3D, a total torque Ta+Tb is in the form of the horse back as shown in FIG. 3E, and the heat J generated by the clutches A and B is as shown in FIG. 3F. Therefore, a changeover shock and the heat J generated by the clutches are reduced remarkably. Additionally, the control of the opening area As of the traveling valve 43 and the control of the motor capacity Dm in the comparative example are shown in FIGS. 4B and 4C, respectively. Any of these control schemes, however, has just enough effect to prevent cavitation of the hydraulic motor 42.

Figure 5:
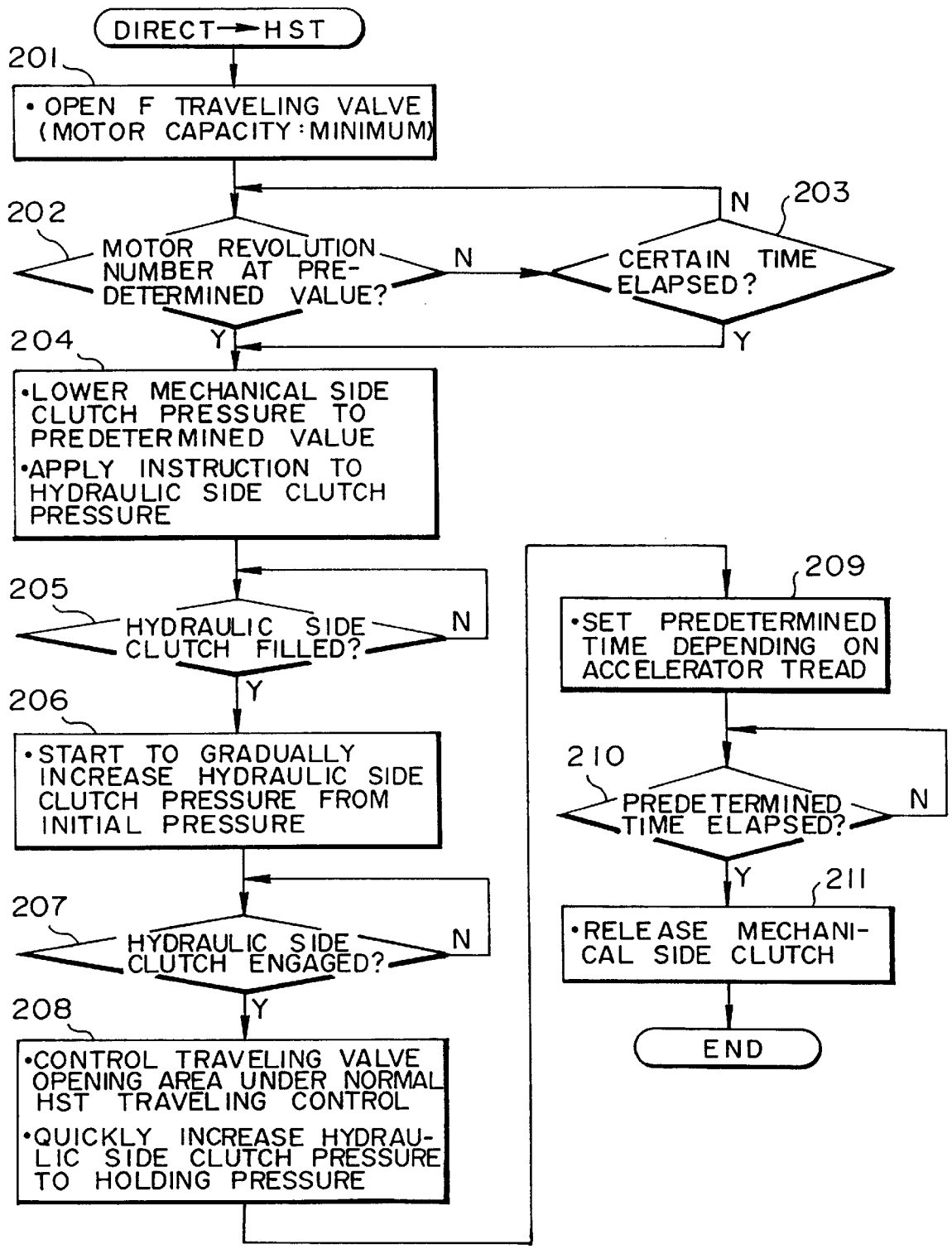
FIG. 5 is a flowchart of a shift-down process according to the invention.

Shift-down control from F2 to F1 will be next described in accordance with the flowchart of FIG. 5 while referring to FIGS. 6A to 6F.

(1) The motor capacity is minimized and the traveling valve 43 is opened to a predetermined amount, which can be set optionally (step 201). More specifically, as indicated by t1 in FIG. 6C, the signal S7 is outputted to the traveling valve 43 to increase its opening area As in the F position and also to minimize the motor capacity. With this step, as shown in FIG. 6D, the revolution number Nm of the hydraulic motor 42 is increased so as to prevent the occurrence of a rotation shock of the hydraulic motor 42 upon engagement of the clutch A.

(2) If the motor 42 increases the revolutions per minute and reaches a predetermined value (step 202), or if a certain time elapses (step 203), then the mechanical side clutch pressure is lowered to a predetermined value, which can be set optionally, and an instruction is applied to raise the hydraulic-side clutch pressure (step 203). More specifically, when the revolution number Nm of the hydraulic motor 42 reaches a preset revolution number Ns, for example, as indicated by t2 in FIG. 6D, the signal S1b applied to the selector valve 23b is reduced to lower the holding pressure Pb of the clutch B for improving the response in the releasing of the clutch B. Substantially at the same time, the signal S1a is sent to the selector valve 23a to start supplying oil to the clutch A. Additionally, to ensure a sufficient flow rate to the hydraulic motor 42, a gradual reduction of the TVC signal S6 is started, as indicated by t2 in FIG. 6B, for starting a gradual increase in the delivery rate of the hydraulic pump 41.

(3) If the hydraulic side clutch A is filled with the oil (step 205), then a gradual increase of the hydraulic side clutch pressure from an initial pressure is started (step 206). More specifically, as indicated by t3 in FIG. 6A, when the clutch A is filled with the oil, the filling completion signal S2 is outputted from the selector valve 23a to the control section 50. Upon receiving this signal S2, as shown in FIG. 6B, the control section 50 stops the gradual reduction in the TVC signal S6. This eliminates a response delay of the delivery rate of the hydraulic pump 41. Note that the filling of the clutch A with oil and a gradual increase in the hydraulic pressure of the clutch A are achieved by a modulation function of the selector valve 23a.

(4) If the hydraulic side clutch A is engaged (step 207), then the opening area of the traveling valve 43 is subjected to normal traveling control, the hydraulic side clutch pressure is quickly increased to its holding pressure (step 208), and the motor capacity is subjected to normal traveling control. More specifically, when the clutch A is engaged as indicated by t4 in FIG. 6A, the signal S7, supplied to the traveling valve 43, and the signal S9, supplied to the servo device 42a, are subjected to normal traveling control. Note that an increase in the hydraulic pressure of the clutch A from an engagement level to the holding pressure Pa is achieved by the modulation function of the selector valve 23a.

(5) A predetermined time, which can be set optionally depending on an accelerator tread, is set (step 209). More specifically, because of a response delay, it takes a certain time ts from the engagement time t4 of the clutch A to obtain an optimum motor driving hydraulic pressure, as indicated by t5 in FIG. 6E. Such a time ts also depends on an accelerator tread. Based on the signal S3 from the throttle opening sensor 51, which works in proportion to an accelerator tread, therefore, this embodiment is arranged to be able to set a longer time ts when the accelerator tread is large, and a shorter time ts when the accelerator tread is small. Note that the time ts can be set to a certain fixed value.

(6) After the elapse of the predetermined time (step 210), the mechanical side clutch is released (step 211). More specifically, after the setting time ts has elapsed, the signal S1a, supplied to the selector valve 23b, is cut off to thereby release the clutch B.

An advantage of the foregoing shift-down control will be described by referring to a comparative example (FIGS. 7A to 7F). Also in the foregoing embodiment, the clutches A and B are released and engaged in crossover relation. Assume a shift-down control without crossover relation wherein the hydraulic pressure of the clutch A is gradually increased after the clutch B is opened, as indicated by t3 in FIG. 7A relating to the comparative example. In this shift-down control, it is required to not only quickly increase the hydraulic pressure of the clutch A, but also to reduce the TVC signal S6 for increasing the delivery rate of the hydraulic pump 41 as indicated by t3 in FIG. 7B. Consequently, since the clutch A must maintain a transmission torque by itself alone, a large changeover shock is caused as indicated by T1 in FIG. 7F, and excessive heat is generated due to slippage of the clutch A.

Figure 6C:
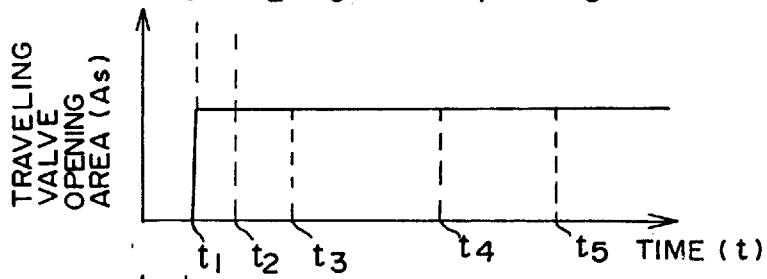
Figure 6D:
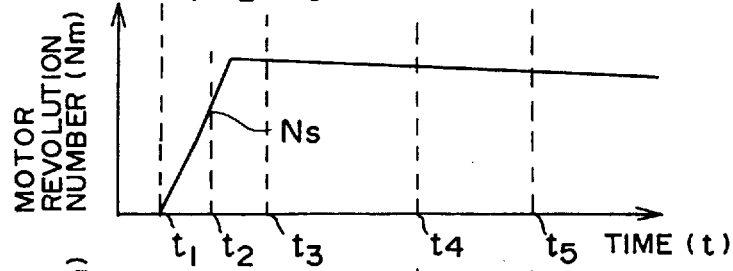
Figure 6E:
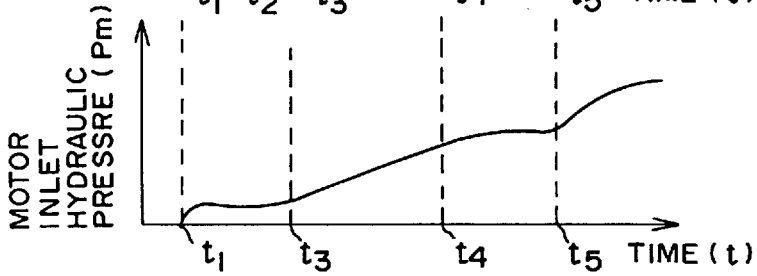
Figure 6F:
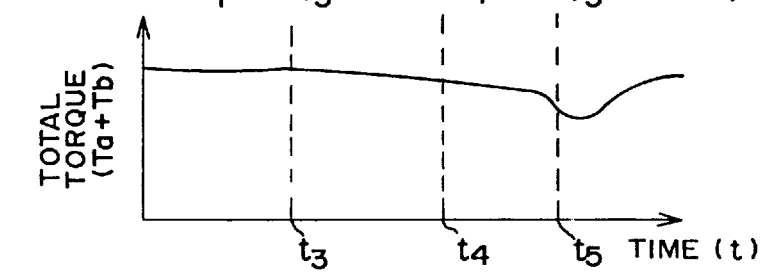
Figure 7C:
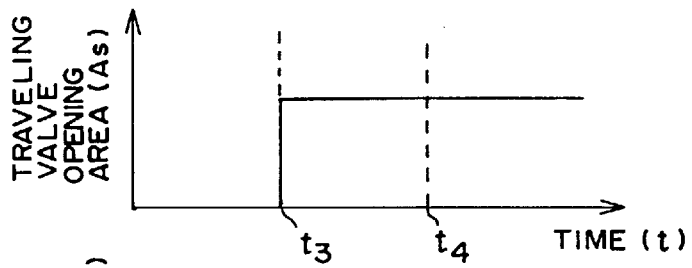
Figure 7D:
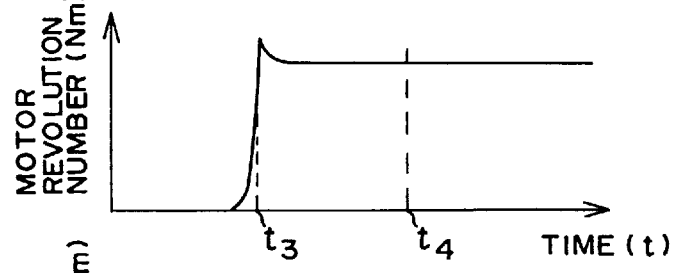
Figure 7E:
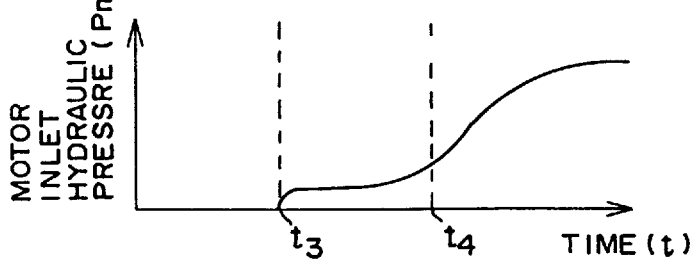
Figure 7F:
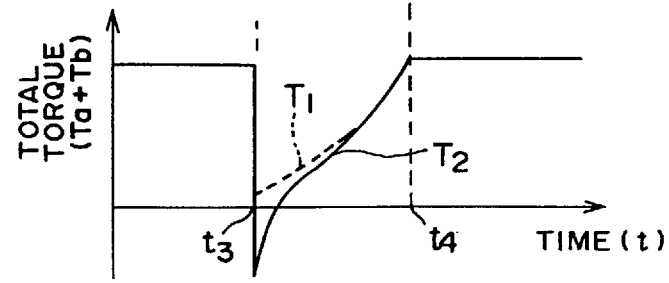

Further, in the foregoing embodiment, the rotation of the hydraulic motor 42 is started before the engagement of the clutch A is started, as indicated by t1 in FIG. 6C. On the contrary, in the comparative example, when the filling completion signal S2 for the clutch A is inputted from the selector valve 23a (at t3), the signal S7 is sent to the traveling valve 43 to open it in the F position, as shown in FIG. 7C. Accordingly, as shown in FIG. 7F, the clutch A is obliged to receive a torque from the output side before starting to rotate the hydraulic motor 42, and causes a very large gear shift shock, as indicated by T2 in FIG. 7F. Of course, the heat generated by the clutch is also increased correspondingly. Such a disadvantage is avoided in the foregoing embodiment.

It is desired to employ the shift-up control and the shift-down control in a combined manner. Also, a shift-down process using an engine brake (i.e., a customary speed reducing process with an accelerator and a foot brake both turned off) is not affected by the pump output.

According to the present invention, as described hereinabove, in the method of power transmission in the mechanical/hydraulic type transmission system comprising hydraulic power transmitting means for transmitting a hydraulic power to the outside through the clutch A and mechanical power transmitting means for transmitting a mechanical power to the outside through the clutch B, the clutches A and B being released and engaged simultaneously or alternately to effect changeover between hydraulic power transmission and mechanical power transmission, the releasing of the clutch A is performed after the engagement of the clutch B is started and before the engagement of the clutch B is completed, upon changeover from hydraulic power transmission to mechanical power transmission. Also, upon changeover from mechanical power transmission to hydraulic power transmission, the releasing of the clutch b is performed after the engagement of the clutch A is completed. Preferably, upon changeover from mechanical power transmission to hydraulic power transmission, the rotaton of the hydraulic motor is started before the engagement of the clutch A is started.

Such crossover control of releasing and engaging of the clutches A and B upon changeover between hydraulic power transmission and mechanical power transmission enables the changeover to be smoothly effected. As a result, it is possible to reduce a changeover shock and the heat generation of the clutches, resulting in longer machine life, and making the operator feel less unpleasant.

INDUSTRIAL APPLICABILITY

The present invention is usefully practiced as a method of power transmission in a mechanical/hydraulic type transmission system, by which changeover is smoothly effected between hydraulic power transmission and mechanical power transmission in the mechanical/hydraulic type transmission system, and hence which can reduce a changeover shock and the heat generation of the clutches, prolong machine life, and make an operator feel less unpleasant.

We claim:

1. A method of transmitting power in a mechanical/hydraulic transmission system which contains:

a hydraulic power transmission for transmitting a mechanical power Pm, which has been converted from a hydraulic power Ph by a hydraulic motor, to outside of the mechanical/hydraulic transmission system by the engagement of a clutch A, and a mechanical power transmission for transmitting a mechanical power Po to the outside of the mechanical/hydraulic transmission system by the engagement of a clutch B, wherein said clutches A and B are released and engaged simultaneously or alternately to effect a changeover from hydraulic power transmission to mechanical power transmission or from mechanical power transmission to hydraulic power transmission;

said method, upon an initiation of a changeover from hydraulic power transmission to mechanical power transmission, comprising the following sequence of steps:

(a) reducing a hydraulic pressure of oil in said clutch A to a predetermined value and holding the thus reduced hydraulic pressure of oil in said clutch A substantially at said predetermined value while starting to supply oil to said clutch B so as to provide an initial hydraulic pressure in said clutch B when said clutch B is filled with oil;

(b) then gradually reducing an opening degree of a traveling valve for forward/reverse switching while continuing to hold said thus reduced hydraulic pressure of oil in said clutch A substantially at said predetermined value and while gradually increasing the hydraulic pressure of oil in said clutch B from said initial hydraulic pressure toward a hydraulic pressure of oil in said clutch B at which said clutch B will be engaged; and (c) then starting to quickly reduce said opening degree of said traveling valve, to maximize a capacity of said hydraulic motor, to quickly increase the hydraulic pressure of said clutch B to a holding pressure, and to reduce the hydraulic pressure of oil in said clutch A from said predetermined value to a value at which said clutch A is released.

2. A method in accordance with claim 1, wherein said step of gradually reducing an opening degree of a traveling valve for forward/reverse switching comprises gradually reducing an opening degree of said traveling valve to lower the revolutions per minute of said hydraulic motor; and wherein said step of starting to quickly reduce said opening degree of said traveling valve, comprises starting to quickly reduce said opening degree of said traveling valve to stop rotation of said hydraulic motor.

3. A method in accordance with claim 1, wherein said step of starting to quickly reduce said opening degree of said traveling valve, to maximize a capacity of said hydraulic motor, to quickly increase the hydraulic pressure of said clutch B to a holding pressure, and to reduce the hydraulic pressure of oil in said clutch A from said predetermined value to a value at which said clutch A is released, is accomplished upon a completion of the engagement of said clutch B.

4. A method in accordance with claim 1, wherein said step of starting to quickly reduce said opening degree of said traveling valve, to maximize the capacity of said hydraulic motor, to increase the hydraulic pressure of said clutch B quickly to a holding pressure, and to reduce the hydraulic pressure of oil in said clutch A comprises:

after the hydraulic pressure of oil in said clutch B has been increased from said initial hydraulic pressure but before engagement of said clutch B is completed, starting to quickly reduce said opening degree of said traveling valve, to maximize the capacity of said hydraulic motor, and to reduce the hydraulic pressure of oil in said clutch A.

5. A method in accordance with claim 4, wherein said step of starting to quickly reduce said opening degree of said traveling valve comprises starting to quickly reduce said opening degree of said traveling valve to stop rotation of said hydraulic motor.

6. A method of transmitting power in a mechanical/hydraulic transmission system which contains:

a hydraulic power transmission for transmitting a mechanical power Pm, which has been converted from a hydraulic power Ph by a hydraulic motor, to outside of the mechanical/hydraulic transmission system by the engagement of a clutch A, and a mechanical power transmission for transmitting a mechanical power Po to the outside of the mechanical/hydraulic transmission system by the engagement of a clutch B, wherein said clutches A and B are released and engaged simultaneously or alternately to effect a changeover from hydraulic power transmission to mechanical power transmission or from mechanical power transmission to hydraulic power transmission;

said method, upon an initiation of a changeover from mechanical power transmission to hydraulic power transmission, comprising the following sequence of steps:

(a) reducing a capacity of said hydraulic motor and opening, by a predetermined opening degree, a traveling valve for forward/reverse switching, so as to cause an increase in revolutions per minute of said hydraulic motor;

(b) reducing a hydraulic pressure of oil in said clutch B to a predetermined value and holding the thus reduced hydraulic pressure of oil in said clutch B substantially at said predetermined value while starting to supply oil to said clutch A to provide an initial hydraulic pressure in said clutch A when said clutch A is filled with oil;

(c) gradually increasing the hydraulic pressure of oil in said clutch A from said initial hydraulic pressure toward a hydraulic pressure of oil in said clutch A at which said clutch A will be engaged;

(d) controlling the opening degree of said traveling valve under normal traveling control and, upon a completion of the engagement of said clutch A, increasing the hydraulic pressure of oil in said clutch A quickly to a holding pressure; and (e) subsequent to said completion of the engagement of said clutch A, reducing the hydraulic pressure of oil in said clutch B from said predetermined value to a value at which said clutch B is released.

7. A method in accordance with claim 6, wherein said step of reducing the hydraulic pressure of oil in said clutch B from said predetermined value to a value at which said clutch B is released is performed at a predetermined time after said completion of the engagement of said clutch A.

8. A method in accordance with claim 7, wherein said predetermined time is set in proportion to an accelerator tread.

9. A method in accordance with claim 7, wherein said predetermined time is a fixed period of time from the completion of the engagement of said clutch A.

10. A method in accordance with claim 6, wherein said step of reducing a hydraulic pressure of oil in said clutch B to a predetermined value is performed upon the revolutions per minute of said hydraulic motor rising to a predetermined value.

11. A method in accordance with claim 6, wherein said step of reducing a hydraulic pressure of oil in said clutch B to a predetermined value is performed after a certain time elapses after said traveling valve is opened to said predetermined opening degree.

12. A method in accordance with claim 6, wherein said method, upon an initiation of a changeover from hydraulic power transmission to mechanical power transmission, comprises the following sequence of steps:

(f) reducing a hydraulic pressure of oil in said clutch A to a predetermined value and holding the thus reduced hydraulic pressure of oil in said clutch A substantially at said predetermined value while starting to supply oil to said clutch B so as to provide an initial hydraulic pressure in said clutch B when said clutch B is filled with oil;

(g) then gradually reducing an opening degree of a traveling valve for forward/reverse switching while continuing to hold said thus reduced hydraulic pressure of oil in said clutch A substantially at said predetermined value and while gradually increasing the hydraulic pressure of oil in said clutch B from said initial hydraulic pressure toward a hydraulic pressure of oil in said clutch B at which said clutch B will be engaged; and (h) then starting to quickly reduce said opening degree of said traveling valve, to maximize a capacity of said hydraulic motor, to quickly increase the hydraulic pressure of said clutch B to a holding pressure, and to reduce the hydraulic pressure of oil in said clutch A from said predetermined value to a value at which said clutch A is released.

13. A method in accordance with claim 12, wherein said step of starting to quickly reduce said opening degree of said traveling valve, to maximize a capacity of said hydraulic motor, to quickly increase the hydraulic pressure of said clutch B to a holding pressure, and to reduce the hydraulic pressure of oil in said clutch A from said predetermined value to a value at which said clutch A is released, is accomplished upon a completion of the engagement of said clutch B.

14. A method in accordance with claim 12, wherein said step of starting to quickly reduce said opening degree of said traveling valve, to maximize the capacity of said hydraulic motor, to increase the hydraulic pressure of said clutch B quickly to a holding pressure, and to reduce the hydraulic pressure of oil in said clutch A comprises:

after the hydraulic pressure of oil in said clutch B has been increased from said initial hydraulic pressure but before engagement of said clutch B is completed, starting to quickly reduce said opening degree of said traveling valve, to maximize the capacity of said hydraulic motor, and to reduce the hydraulic pressure of oil in said clutch A.

15. A method in accordance with claim 12, wherein said step of reducing a hydraulic pressure of oil in said clutch B to a predetermined value is performed upon the revolutions per minute of said hydraulic motor rising to a predetermined value.

16. A method in accordance with claim 12, wherein said step of reducing a hydraulic pressure of oil in said clutch B to a predetermined value is performed after a certain time elapses after said traveling valve is opened to said predetermined opening degree.

17. A method in accordance with claim 12, wherein said step of reducing the hydraulic pressure of oil in said clutch B from said predetermined value to a value at which said clutch B is released is performed at a predetermined time after said completion of the engagement of said clutch A.

18. A method in accordance with claim 17, wherein said predetermined time is set in proportion to an accelerator tread.

19. A method in accordance with claim 17, wherein said predetermined time is a fixed period of time from the completion of the engagement of said clutch A.

20. A method in accordance with claim 17, wherein said value at which said clutch B is released is zero.

* * * * *